Feb. 21, 1950 — R. BEACH — 2,497,924

ELIMINATION OF STATIC ELECTRICITY FROM AIRCRAFT

Filed Nov. 5, 1946

ROBIN BEACH
INVENTOR.

BY
ATTORNEY.

Feb. 21, 1950 R. BEACH 2,497,924
ELIMINATION OF STATIC ELECTRICITY FROM AIRCRAFT
Filed Nov. 5, 1946 2 Sheets-Sheet 2

Robin Beach
*INVENTOR.*

BY *Philip S. McLean.*
*ATTORNEY.*

Patented Feb. 21, 1950

2,497,924

UNITED STATES PATENT OFFICE 2,497,924

ELIMINATION OF STATIC ELECTRICITY FROM AIRCRAFT

Robin Beach, Brooklyn, N. Y.

Application November 5, 1946, Serial No. 707,925

2 Claims. (Cl. 175—264)

The invention here disclosed relates to the dissipation, neutralization or elimination of static electricity.

Special objects of the invention are to accomplish the elimination of static electricity impressed or generated on moving surfaces, particularly those operating at ultra-high speeds, such as the airfoil surfaces of airplanes.

Static electricity imparted to or generated on high speed, all-metal aircraft has had the effect of obliterating or reducing incoming communication signals, including 2-way communication systems, beam signals, altimeter signals and the like, through which position and flight have been indicated and directed, causing great loss of life and property.

Electrostatic charges on aircraft are classifiable as precipitation static, produced by actual physical contact with atmospheric particles such as rain, mist, fog, snow, hail, sleet, ice crystals and dust and induction or conduction static resulting from the proximity of electrified clouds or lightning strokes from clouds.

Under the first class, in which snow may be mentioned as the greatest offender, static electricity is generated directly by the high velocity friction between the airplane and the precipitation particles and in which case the airplane generates its own electrification.

In other instances, atmospheric particles such as raindrops, fog globules, dust and the like may be highly charged through mutual collision or otherwise. When these particles contact the leading edge of airplane surfaces they impart their charges to the aircraft, thus electrifying the plane without process of generation by the airplane.

The induction of electrification on an airplane through proximity of electrified clouds causes free electrons in the metallic atoms of the airplane structure to be either attracted toward the charged clouds, if it be positively charged, thus to negatively charge the structure nearer the cloud, with remote parts positively charged, or vice versa if the cloud be negatively charged.

If a cloud is charged to the point of initiating a lightning stroke to an adjacent cloud or to earth, the extensive wing span of highly conductive metal may direct the stroke to and through the aircraft, thus impressing an enormous quantity of electricity onto the metallic surfaces of the structure.

Regardless of the manner in which an airplane is electrified, the electrical potential may be raised to the order of many millions of volts.

This potential does not express itself or its effect uniformly over the metallic structure but, on the contrary, it creates an electric field which emanates from every part of the surface with a distribution pattern determined by the geometry of the structure. In actual effect the potential gradient, which expresses in volts per unit of length the intensity of the divergent electric field at any part of the surface, increases from the fuselage or body of the plane toward the tips of the wings and on stabilizers and other surfaces toward the tips at locations where the radii of curvature are least. The potential gradients thus are highest wherever the curves are sharpest, such as at the wing and stabilizer tips, the trailing edges of wings and stabilizers, the trailing edges of propeller blades, at the edges of rivets and cotter pins and, in fact, at any sharp edges of the metal structure.

Under the influence of these high, localized, potential gradients, the molecules of the ambient air become stressed, electrically, to the point of emitting electrons and thus creating positive and negative air ions. If the surface of the airplane is negatively charged, the positive air ions are attracted to the surface of the plane, thereby neutralizing an equal number of the negative charges. In this manner ionization produced by the high potential gradient of the airplane creates a natural means for dissipating the high electrification of the craft. In so doing the uncontrolled ionization at innumerable points on the airplane, and particularly at projections, causes radiation to be set up in the atmosphere over wide wave bands of frequency, which intercept the antennae on the airplane and thus generate interfering parasitic signals which may completely blank out desired signals.

If an airplane is electrified to such a high potential that it breaks out into copious ionization and corona discharge, it lowers the potential in proportion to the neutralization of the electric charges.

Generally the worst conditions for obliteration of communications are those produced by high induction from near-by clouds or by direct lightning strokes. These, though, are usually of relatively short duration. Experience has shown that high values from precipitation static are the most serious offenders in creating disturbances in the communication receivers or in obliterating intelligible reception, as such disturbances may last for several hours, isolating an aircraft from safe control for extended periods.

One method for effecting controlled discharge of electrified airplanes through localized ionization, developed as a result of extensive experimentation and investigation, was to use a fine wire trailing out from the tail of the airplane. This wire being electrically connected with the metal surfaces of the airplane, provided a means for inducing corona discharge when the potential of the aircraft became high enough to reach the critical potential gradient at the wire for the initiation of ionization.

This method was unsatisfactory and ineffectual, electrically, because of inadequate discharge from a single wire source, and mechanically, because of the fragility of a single fine wire operating in the area of greatest air turbulence.

As a result of further extensive studies there has been developed a form of static dissipator consisting of a wick of rope-type fibres or floss, about a foot long, encased in a flexible insulating tube and clamped at one end in a lug, connectable to the trailing edge of an airplane surface. This wick is impregnated with a colloidal precipitate of silver salts and at the free end is permitted to extend about an inch beyond the insulating tube, where it frays from the turbulence of the air slip-stream, to provide ionization of the ambient air and effect some neutralization for relieving the airplane surfaces of electric charge.

These wicks are designed with a resistance of about ten megohms throughout their length, the alleged purpose of said high resistance between the area of ionization and the metal structure of the airplane being to "cushion" the effect of the discharge current so as not to create radiation in the atmosphere sufficient to shock excite the radio receivers and thus destroy the quality of communication signals.

The ends of the wicks exposed beyond the enclosing insulating tubes fray with the air turbulence, waste away, require trimming back of the insulating tubing, become soaked and inoperative from engine oil escaping over wing surfaces, and for such reasons are unsatisfactory and require frequent replacement. The high resistivity inhibits freedom of ionization at the tips of the wicks and therefore restricts the discharging properties of these so-called high "cushioning" resistances, thereby requiring a great many of them on an airplane to be effectual. These trailing wicks also are in the way in the handling and cleaning of the airplanes and are objectionable as being unsightly, temporary in character, and requiring frequent servicing.

From the foregoing it will be appreciated that further special objects of the present invention are to overcome the objections and shortcomings such as mentioned and to provide a practical, efficient, lasting and reliable form of static eliminator which can be readily applied to existing aircraft or be built into newer aircraft, without impairing, disfiguring or otherwise objectionably altering the structure, operation or appearance of such craft.

Other important objects are to provide apparatus of the character indicated which will be relatively inexpensive and which will be fully automatic and self-sustaining and operate as needed, without any care, attention or servicing.

Another important object of the invention is to be able to attach, readily and safely, apparatus of the type here disclosed onto parts of the aircraft for the control of electrification to which wicks could not be applied, notably on the trailing edges of propeller blades. Because of their very high air speed, propellers become highly electrified. This uncontrolled electrification is particularly objectionable and dangerous in causing sparks to puncture the oil films between the propeller shaft and its bearings, between the surfaces of the main engine bearings and between the pistons and their cylinder walls. These continual showers of sparks not only destroy the lubricating qualities of the oil but cause rapid deterioration of the wearing surfaces of the bearings and the cylinder walls and create dangerous fire and explosion hazards. Engines have been reported as having been thus damaged on occasions to the extent of requiring complete overhaul after only a few hours of flight.

Further objects are to provide apparatus as indicated, which will not be affected or injured by conditions ordinarily encountered in the operation of aircraft, such as being subjected to oil and water, mud and icing conditions and the like.

Further special objects are to accomplish the elimination of static electricity with a "quiet" discharge which will create practically no noise levels in the communication receivers.

Other desirable objects and the novel features through which the purposes of the invention are attained are set forth or will appear in the course of the following specification.

The drawings accompanying and forming part of the specification illustrate certain present practical embodiments of the invention. Structure and arrangement, however, may be modified and changed as regards the immediate illustration, all within the true intent and broad scope of the invention as hereinafter defined and claimed.

Fig. 1 in the drawings is a perspective view showing the invention as applied to the trailing edges of airfoil surfaces;

Figure 1:
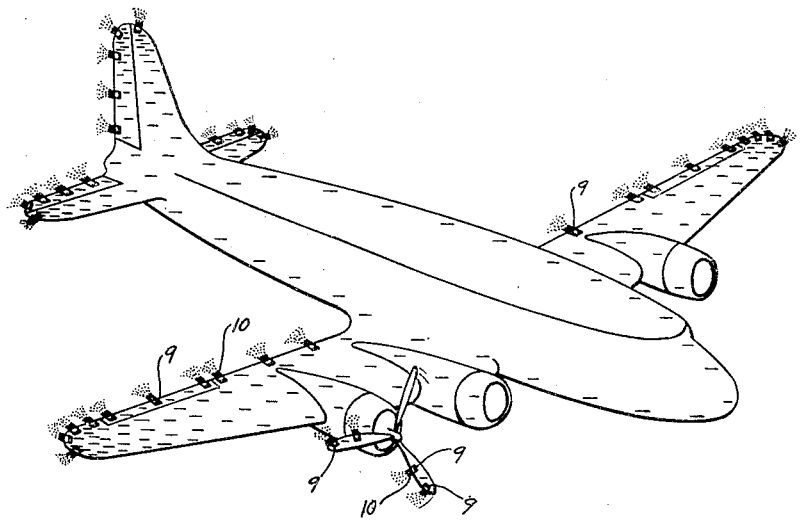

In Fig. 1 there is represented an all-metal, high speed airplane, the dashes showing the relative concentration of negative electrostatic charges toward the tips and around the curved end edges of the airfoil surfaces. This includes the trailing edges of wing, control, stabilizer and propeller surfaces.

To take care of these variable conditions the lectrostatic dissipating system is made up, in the illustration, of ionizing units which can be placed singly or grouped according to estimated degrees of electric charge concentration.

Figure 2:
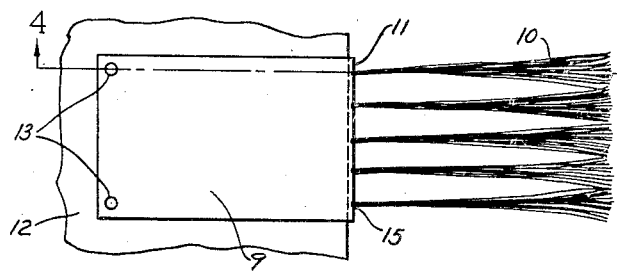
Fig. 2 is a plan view of one of the ionizing units now in actual use and shown here as applied over the trailing edge of an airfoil.
Figure 3:
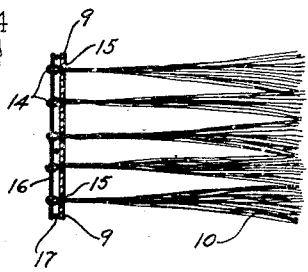
Fig. 3 is a sectional view taken through the folded mounting strip of one of the ionizers.
Figure 4:
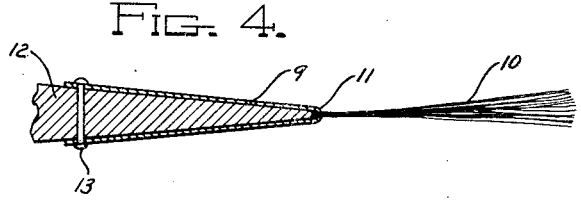
Fig. 4 is a broken sectional view illustrating the attachment of the unit over the trailing edge of an airplane surface, appearing as on the line 4—4 of Fig. 2.

These units may all be alike and consist, as shown in Figs. 2, 3 and 4, of patches 9 attachable to trailing edge surfaces and carrying projecting tufts 10 of massed, sharply pointed fine wire bristles.

The patches in which the bristles are rooted may be strips or plates of thin metal sharply bent or folded at 11 to conform to and fit closely over trailing edges of the structure 12, where they may be secured by through rivets or other suitable fastenings 13. In addition, or possibly as an alternative, conductive rubber cement may be applied within the fold of the patch, embedding the anchor wire and the tufts of sharply pointed looped bristles, to provide a tight fit of the trailing edge of the airfoil in the fold of the patch and to prevent accumulation of oil and dirt therein.

The individual bristles may be of hard drawn spring brass with high wearing qualities and resistance to abrasion and crystallization, of approximately 0.002" to 0.004" diameter. The wires of the individual tufts may fan out approximately as indicated and may project from the mounting plate a distance of approximately one-half to two inches.

The tufts are firmly anchored in the patch plate, in the illustration by passing the looped inner ends 14 of the tufts through openings 15 in the fold of the plate and passing an anchor wire 16 through the inserted loops, which wire may be secured as by soldering it to the plate at 17.

The ionizing properties of the bristles are rendered radio quiet in their discharge by reducing the ends of them to extreme sharpness.

Because of the fineness of these wires the sharpening may be effected by chemical reduction, as by acid etching the end portions of the wires.

After the sharpening operation the complete unit may be cadmium plated to prevent corrosion and to make the units match as closely as possible the appearance of the metal plane surfaces. Thus finished, the units are practically unnoticeable. Further, they do not interfere in any way in the handling or control of the aircraft. While the tips of the bristles are smooth and extremely sharp, they are so flexible that they will yield and bend on engagement by the hand and thus will not injure those working on or cleaning the plane, nor will they be thereby damaged.

With the all-metal construction disclosed there is no appreciable deterioration, even under the most turbulent high speed conditions and with the various effects of oil and water, snow and sleet, mud and icing conditions to which the ionizers may be subjected.

The discharge is quiet and practically imperceptible in ordinary communication receivers, and no attention or servicing of the ionizers is required. In case of mechanical injury such as might result in the handling and servicing of an airplane, the injured unit or units can be quickly removed and be replaced by a new unit or units.

The spacing of the ionizer units shown in Fig. 1 is purely illustrative, since concentration of electrostatic charges will vary in different aircraft. Generally speaking, the charges are greatest toward the tips and around the curving ends of the airfoil surfaces and therefore more ionizers and in more closely spaced relation will be located at such points. The ionizers at the ends of the wing tips and other surfaces where the bristles will project into the main slipstream, may be of heavier structure, the bristle wires, for example, being of stiffer and possibly larger size wires.

Moving surfaces such as propeller blades may be protected as indicated in Fig. 1, as by applying one or more of the ionizers to the trailing edge at the tip of each blade and possibly one or more such units at some point or points inward from the tip end.

While generally practical to make the ionizers in small units, possibly of a single tuft to a unit in some cases, and use these in any number and arrangement required, it is contemplated that the ionizer may be made as a single complete long unit applied to a trailing edge and carrying tufts of bristles either in a continuous row or in different positions along the patch construction.

Figure 5:
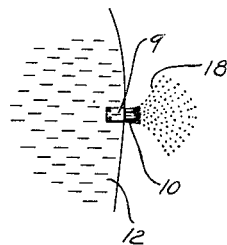
Figs. 5 and 6 are fragmentary diagrams illustrating the action of the ionizers.

Fig. 5 shows how the electric field created at the bristles by high potential from the electrified airfoil produces a high potential gradient at the tips, substantially as represented at 18.

Figure 6:
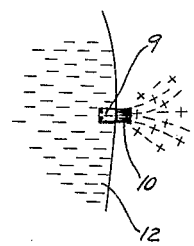

Fig. 6 is a plan view like Fig. 5, in which air ions are shown at the tips of the bristles as the result of the ionizing action of the air molecules caused by the high potential gradient.

Figure 7:
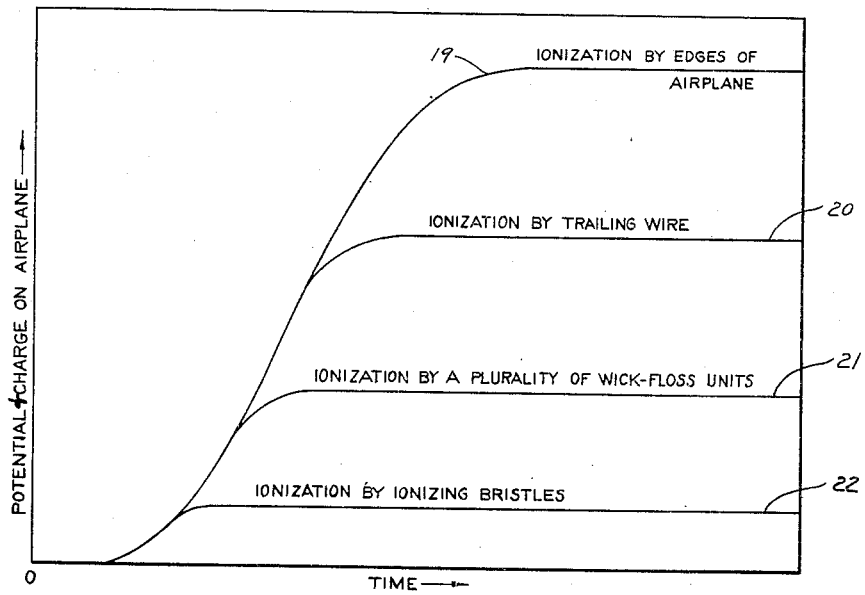
Fig. 7 is a diagram showing by comparative curves the relation of the present invention to previous endeavors.

The family of curves represented in Fig. 7 show very approximately the relative potential levels existing at any given part of an airplane under equilibrium conditions of equality of charging and discharging rates first at 19 when no artificial means other than the sharp and curved parts of the structure provide for electrostatic control, curve 20 where the use of a single trailing wire produces increased discharge which establishes a lower potential level, curve 21 in which the use of a plurality of wick electrostatic dissipators increase the discharge rate thereby further lowering the potential level, and curve 22 where the potential level is reduced to the minimum by employing the super-sensitive tufts of ionizing bristles herein disclosed to attain the highest discharging action.

The high potential gradient created at the sharp ends of the fine wire bristles maintains a particularly effective, soft or quiet discharge of electrostatic energy that may accumulate, be generated or be present on the aircraft surfaces. The ionizers, because of their flexibility and resiliency, are practically self-cleaning in the turbulent air flow in which they operate. The mounting patches and projecting bristles do not affect flying or control efficiency, offering practically inappreciable drag.

What is claimed is:

1. All-metal dischargers for initiating radio-quiet discharge of static electricity from the charged surfaces of aircraft automatically as soon as such surfaces become charged and continuously for so long as charging conditions continue, comprising elongated, flexible, uninsulated, fine metal wire bristles in the order of four thousandths of an inch in diameter or less, massed together in intimately contacting engagement in groups forming tufts, means for securing said tufts of fine wire bristles at one end in electrically connected engagement with trailing edge portions of electrostatically charging surfaces of aircraft and with the opposite ends projecting freely into the slip stream of the aircraft and said free ends of said fine metal wire bristles having smooth, long, tapered, acid etched points of extreme sharpness for individually and collectively dissipating and carrying off electrification in such small discharges as not to interfere with radio communication and said points being non-corrosive to avoid atmospheric etching, whereby to continue effective radio-quiet discharge so long as electrostatic charging conditions exist.

2. All-metal dischargers for initiating radio-quiet discharge of static electricity from the charged surfaces of aircraft automatically as soon as such surfaces become charged and continuously for so long as charging conditions continue, comprising elongated, flexible, uninsulated, fine metal wire bristles in the order of four thousandths of an inch in diameter or less, massed together in intimately contacting engagement in groups forming tufts, means for securing said tufts of fine wire bristles at one end in electrically connected engagement with trailing edge portions of electrostatically charging surfaces of aircraft and with the opposite ends projecting freely into the slip stream of the aircraft and said free ends of said fine metal wire bristles having smooth, long, tapered, acid etched points of extreme sharpness for individually and collectively dissipating and carrying off electrification in such small discharges as not to interfere with radio communication and said points being non-corrosive to avoid atmospheric etching, whereby to continue effective radio-quiet discharge so long as electrostatic charging conditions exist, said means for securing said tufts including thin, flat, sheet metal plates folded in V-shaped formation to engage over trailing edges of the aircraft and having the inner ends of the tufts fastened within the folds of said plates.

ROBIN BEACH.

REFERENCES CITED

The following references are of record in the file of this patent:

UNITED STATES PATENTS

| Number | Name | Date |
|---|---|---|
| 997,085 | O'Toole | July 4, 1911 |
| 1,419,261 | Howard | June 13, 1922 |
| 1,482,642 | Dinkela | Feb. 5, 1924 |
| 2,163,294 | Simons | June 20, 1939 |
| 2,303,321 | Bennett | Dec. 1, 1942 |
| 2,320,146 | Leake | May 25, 1943 |
| 2,333,144 | Bennett | Nov. 2, 1943 |
| 2,466,024 | Hall | Apr. 5, 1949 |
| 2,466,311 | Hall | Apr. 5, 1949 |

FOREIGN PATENTS

| Number | Country | Date |
|---|---|---|
| 581,695 | France | Dec. 3, 1924 |

OTHER REFERENCES

Magnetism and Electricity, a Manual for Students in Advanced Classes, by E. E. Brooks and A. W. Payser, published by Longmans, Green and Co., pages 20, 21 and 22.